United States Patent
Kim

(10) Patent No.: US 7,274,167 B2
(45) Date of Patent: Sep. 25, 2007

(54) POSITION-RECOGNIZING SYSTEM FOR SELF-MOVING ROBOT

(75) Inventor: Young-Gie Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/330,257

(22) Filed: Jan. 12, 2006

(65) Prior Publication Data

US 2006/0261772 A1 Nov. 23, 2006

(30) Foreign Application Priority Data

May 17, 2005 (KR) ...................... 10-2005-0041334

(51) Int. Cl.
*G05D 1/02* (2006.01)
(52) U.S. Cl. .............................. 318/587; 901/1; 701/1; 701/22
(58) Field of Classification Search ................ 318/587, 318/580, 583; 901/1; 701/1, 22
See application file for complete search history.

(56) References Cited

U.S. PATENT DOCUMENTS

| | | | | |
|---|---|---|---|---|
| 4,908,557 A | * | 3/1990 | Sudare et al. ................ | 318/587 |
| 5,189,612 A | * | 2/1993 | Lemercier et al. ............ | 701/23 |
| 5,440,216 A | * | 8/1995 | Kim ............................ | 318/587 |
| 5,446,445 A | * | 8/1995 | Bloomfield et al. ......... | 340/521 |
| 5,682,313 A | * | 10/1997 | Edlund et al. ............... | 342/127 |
| 6,009,357 A | * | 12/1999 | Wellman et al. .............. | 701/23 |
| 6,345,217 B1 | * | 2/2002 | Zeitler et al. ................. | 701/23 |
| 6,984,952 B2 | * | 1/2006 | Peless et al. ................. | 318/580 |
| 2005/0071056 A1 | * | 3/2005 | Tondra et al. ................ | 701/23 |
| 2005/0221840 A1 | * | 10/2005 | Yamamoto et al. ....... | 455/456.3 |

FOREIGN PATENT DOCUMENTS

| | | |
|---|---|---|
| KR | 1988-0005368 | 6/1988 |
| KR | 97-0000582 | 1/1997 |
| KR | 10-2004-0047371 | 6/2004 |
| KR | 10-0480143 B1 | 1/2005 |

* cited by examiner

*Primary Examiner*—Rita Leykin
(74) *Attorney, Agent, or Firm*—Birch, Stewart, Kolasch & Birch, LLP

(57) ABSTRACT

Disclosed is a position-recognizing system of a self-moving robot. A position-recognizing system of a self-moving robot includes: a floor in which a magnet is inserted; and a self-moving robot provided with a magnetic sensor that can sense the magnet while the robot is moving on the floor.

According to this, a magnet mounted in a floor is sensed through the magnetic sensor, and thusly a current location of the self-moving robot can be accurately recognized, so that the self-moving robot can be precisely controlled.

17 Claims, 3 Drawing Sheets

POSITION-RECOGNIZING SYSTEM FOR SELF-MOVING ROBOT

BACKGROUND OF THE INVENTION

1. Field of the Invention

The present invention relates to a position-recognizing system for a self-moving robot, and more particularly, to a position recognizing system for a self-moving robot capable of accurately recognizing a current location of a robot by detecting an indication previously mounted in a certain position of a floor through a sensor provided at the robot.

2. Description of the Background Art

In general, various research activities on self-moving robots are ongoing according to their use. In the present specification, a robot cleaner, which is most widely used of the self-moving robots, is taken as an example for the convenience of explanation.

A robot cleaner senses a cleaning area and an obstacle by using a sensor by a command of a control unit, and travels the cleaning area, automatically cleaning the area. When power of a battery provided in the device is exhausted, the robot cleaner moves to a charging station which is provided at a predetermined position and is recharged. After the recharging is completed, the robot cleaner returns to its original position and performs cleaning.

Such a conventional robot cleaner senses its location and the cleaning area by using an ultrasonic sensor or a vision system.

As one example, in the Korean Patent 10-1991-0002407, a robot cleaner is disclosed which detects a distance with front, left and right sides through an ultrasonic sensor installed at the front, left and right sides of a vacuum cleaner, moves in zigzags, repeating straight advance-180 degree right turn-straight drive-180 degree left turn, and thusly detects whether there is a place to be cleaned.

As another example, in the Korean Patent(10-1995-0026477), a robot cleaner is disclosed, which measures a distance and a moving angle from a wall of the robot cleaner by an ultrasonic sensor.

As still another example, in the Korean Patent (10-2004-0047371), a robot cleaner is disclosed which avoids an obstacle by capturing the inside of a space to be cleaned using a vision system.

However, if a location of the robot cleaner is controlled by ultrasonic waves or a vision system, an error may occur in measuring a location of the robot cleaner according to a state of a captured surface and a reflection surface where the ultrasonic waves are reflected. Also, even though the accurate location measurement is made, the robot cleaner may accidentally slide according to a state of a floor or may not reach an objective spot due to an unexpected collision with an obstacle.

SUMMARY OF THE INVENTION

Therefore, an object of the present invention is to provide a position-recognizing system of a self-moving robot capable of accurately controlling a position of a robot.

To achieve these and other advantages and in accordance with the purpose of the present invention, as embodied and broadly described herein, there is provided a position-recognizing system of a self-moving robot comprising: a floor in which a magnet is inserted; and a self-moving robot provided with a magnetic sensor that can sense the magnet while the robot is moving on the floor.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a unit of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

A position-recognizing system of a self-moving robot in accordance with one embodiment of the present invention will now be described with reference to accompanying drawings.

Figure 1:
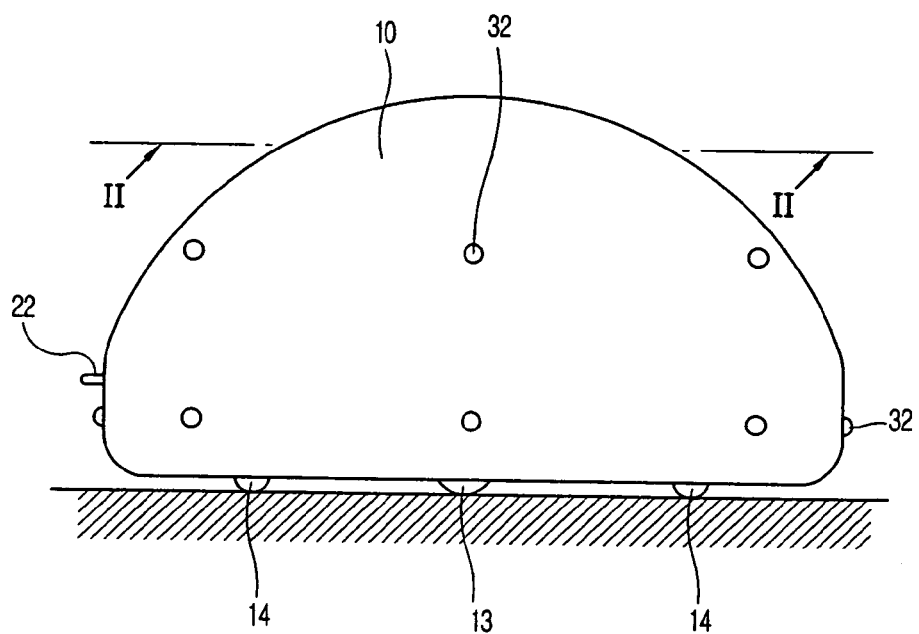
FIG. 1 is a schematic view that illustrates a robot cleaner in accordance with one embodiment of the present invention.
Figure 2:
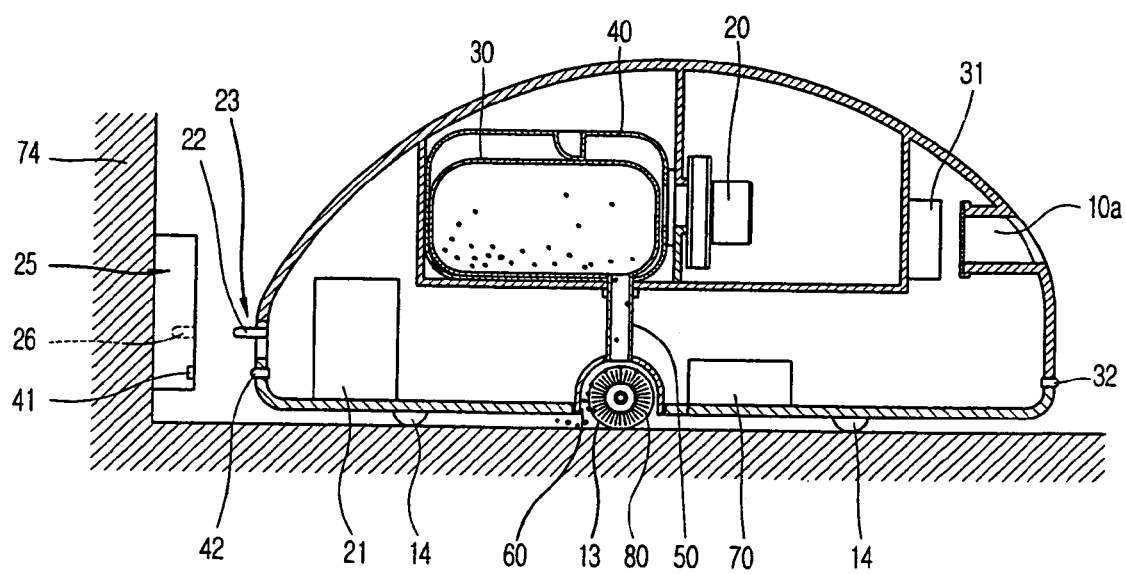
FIG. 2 is a sectional view taken along line II-II of FIG. 1.
Figure 3:
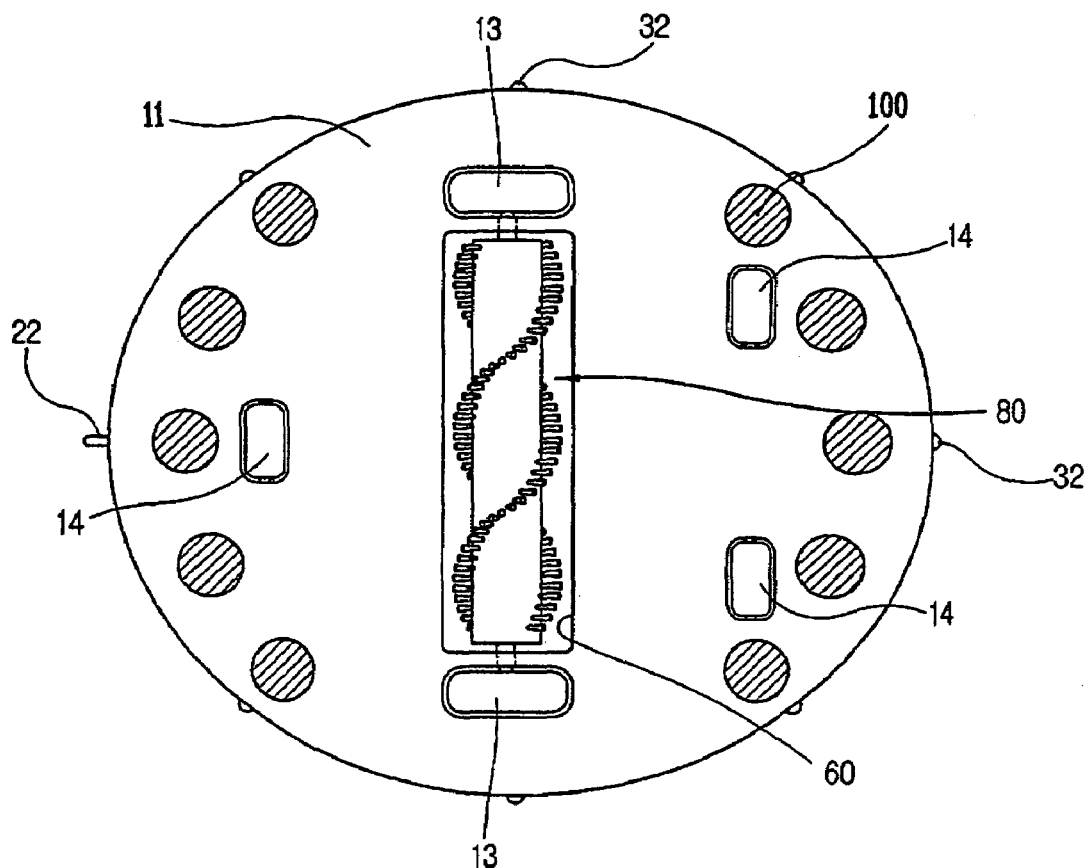
FIG. 3 is a bottom view of the robot cleaner of FIG. 1.

FIG. 1 is a schematic view that illustrates a robot cleaner in accordance with one embodiment of the present invention, FIG. 2 is a sectional view taken along line II-II of FIG. 1, and FIG. 3 is a bottom view of the robot cleaner of FIG. 1.

With reference to FIGS. 1 and 2, a robot cleaner includes a fan motor 20 installed inside a body case 10 and generating an intake force, a collecting container 40 installed in front of the fan motor 20 and provided with a dust bag 30 collecting dust and filth drawn in by the intake force of the fan motor 20, an inlet 60 provided at a lower side of the body case 10 and connected with the collecting container 40 by a connection pipe 50, for introducing dust and foreign substances on a floor, a control unit 70 for controlling operation of each constituent, and a main brush 80 rotatably installed inside the inlet 60 and brushing off the dust and filth from the floor.

A battery 21 which is recharged and discharged is installed inside the body case 10, and a charging terminal part 23 provided with a charging terminal 22 is provided at the rear side.

A power terminal portion 25 installed on a wall 74 of a room has a connection terminal 26, so that the battery 21 installed inside the body case 10 can be recharged in a state that the charging terminal 22 is in connection with the connection terminal 26.

A light emitting portion 41 is installed at a lower side of the power terminal part 25 so as to induce the body case 10 of the cleaner to the power terminal part 25, and a light receiving portion 42 is installed at the rear side of the robot cleaner in order to receive an optical signal emitted from the light emitting portion 41.

An ultrasonic wave transmitter 31 for transmitting the ultrasonic waves is installed at the front of the inside of the body case 10, and an ultrasonic wave receptor 32 corresponding to the transmitter 31, for receiving an ultraviolet wave reflected from an obstacle is installed at a lower side of the body case 10. A path 10a through which the ultrasonic wave sent from the ultrasonic wave transmitter 31 goes out of the robot cleaner is penetratingly formed at the body case 10 corresponding to the ultrasonic wave transmitter 31.

Referring to FIG. 3, a pair of driving wheels 13 driven by a motor and disposed at both end portions of the main brush 80 are installed at the lower side of the body case 10 at a certain interval between each other.

A plurality of auxiliary wheels 14 for supporting the body case 10 and maintaining a horizontal state are installed in front and at the rear of the driving wheels.

A magnetic sensor 100 functioning as a sensor is installed on the bottom of the body case 10. The magnetic sensor senses a magnet installed at a specific portion in a floor in order to work as an indication, and provides to the control unit 70, the information on the current location of the robot cleaner in a signal form.

A plurality of magnetic sensors 100 are disposed at an edge of the bottom 11 in a fan shape at regular intervals therebetween. As occasion demands, the sensors 100 may be disposed irregularly, or may be installed at the central portion of the bottom 11.

The control unit 70 determines whether the robot cleaner moves to a programmed position upon receiving a signal from the magnetic sensor 100. If there is an error, the control unit 70 corrects the error and then moves the robot cleaner to an objective position.

Hereinafter, a method of arranging magnets providing position information to the robot cleaner by interworking with the magnetic sensor 100 will now be described with reference to FIGS. 4 and 5.

Figure 4:
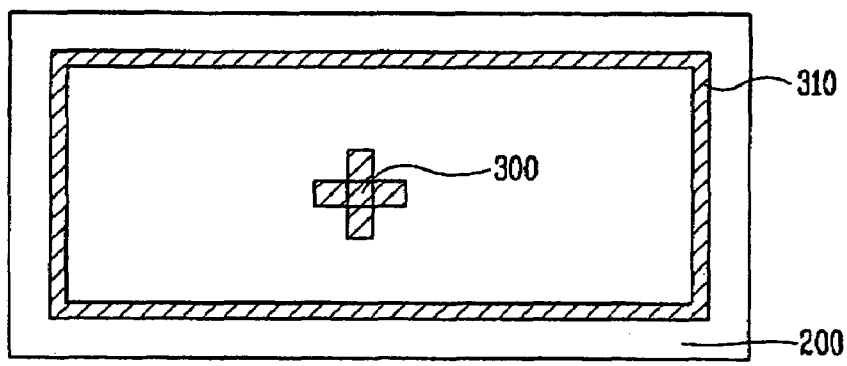
FIG. 4 is a view that illustrates a disposition of a magnet installed at a floor for the purpose of controlling a position of the robot cleaner of FIG. 1.
Figure 5:
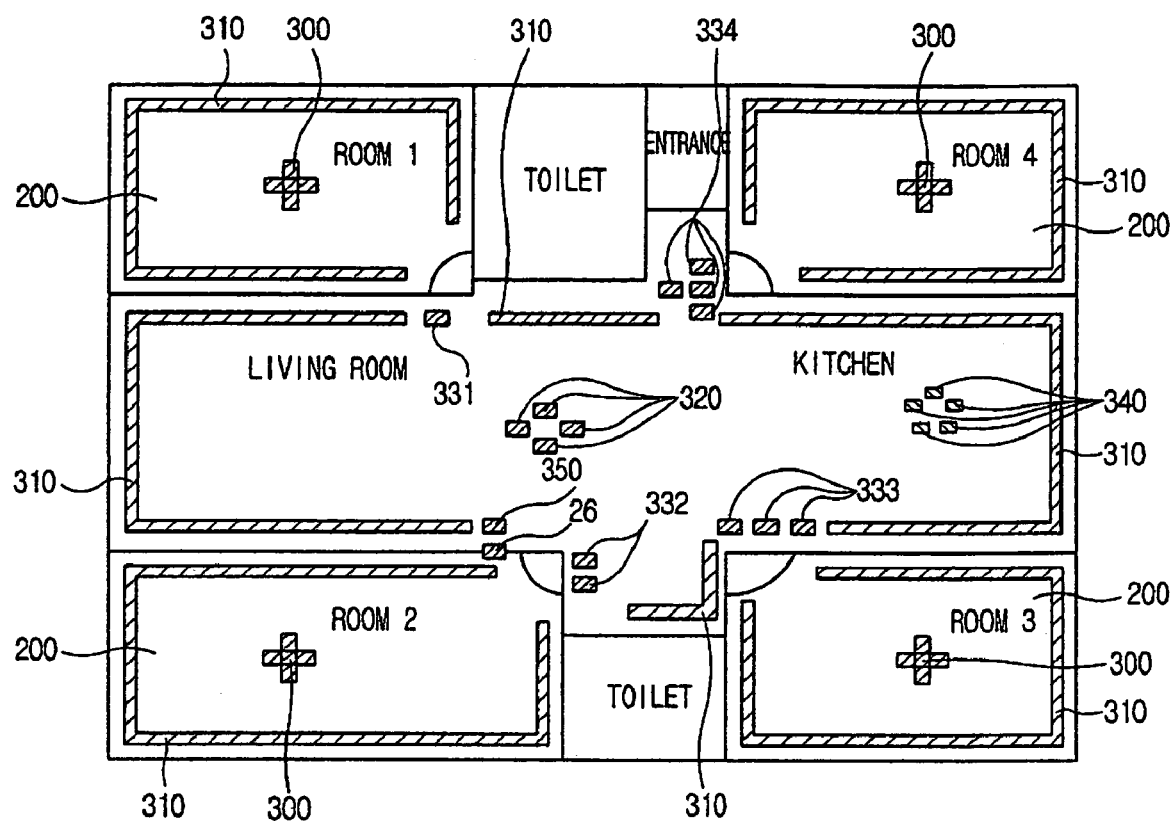
FIG. 5 is a view that illustrates another example of a disposition of the magnet installed at a floor for the purpose of controlling a position of the robot cleaner of FIG. 1.

FIG. 4 is a view that illustrates a disposition of magnets installed in a floor for the purpose of controlling a position of the robot cleaner of FIG. 1, and FIG. 5 is a view that illustrates another example of a disposition of the magnet installed at a floor for the purpose of controlling a position of the robot cleaner of FIG. 1.

As shown in FIG. 4, a disposition structure of magnets includes a center identification portion 300 installed at the center of a floor 200 and formed by arranging a magnet in a cross form, and an outer edge identification portion 310 installed around an outer edge of the floor 200 and formed in a connected line form so as to inform a moving limit of the robot cleaner and thusly prevent the robot cleaner to collide with a wall.

Any magnet would be adequate to be used if it has a magnetic force strong enough to be recognized by a magnetic sensor 100, and the magnet does not have to have a magnetic force strong enough to draw metal pieces to a room. Meanwhile, if the magnets are properly disposed in the floor 200, a magnetic field is formed and it may help people's health.

Referring to FIG. 5, a magnet disposition structure applied to a general house having several rooms and a living room will now be described.

The magnet structure disposed from room 1 to room 4, includes a center identification portion 300 installed at the center of a floor 200 and formed by arranging a magnet in a cross form, and an outer edge identification portion 310 installed at an outer edge of the floor 200 and formed in a connected line form so as to inform a moving limit of the robot cleaner and thusly prevent the robot cleaner to collide with a wall.

The magnet structure disposed in a living room includes a charging identification portion 350 installed in front of a connection terminal 26 so as to identify the connection terminal 26 and formed of one magnet.

The magnet structure disposed toward an entrance of room 1~room 4, includes entrance identification portions 331 to 334 including a first room identification portion 331 installed at an entrance of a first room and formed of one magnet, a second room identification portion 332 installed at an entrance of a second room and formed of two separate magnets, a third room identification portion 333 installed at an entrance of a third room and formed of three magnets separately disposed in a line form, and a fourth room identification portion 334 installed at the entrance of a fourth room and formed of four magnets separately arranged in a T-shape.

Also, the magnet disposition structure at a central portion of the living room includes a living room identification portion 320 formed of four magnets separately arranged in a diamond form in order to inform a reference position of the robot cleaner. Also, the magnet disposition structure of a kitchen includes a kitchen identification portion 340 formed of five separate magnets.

As described above, if the disposition structures vary according to each room (room 1 to room 4), the living room and the kitchen, such differences are sensed and the operation of the robot cleaner can vary according to characteristics of each room.

For example, the robot cleaner performs cleaning at a high speed in room 1 because there is no obstacle, and performs careful cleaning at a low speed in room 2 because there is furniture like chairs. Also, if there is a rug on the living room floor, the robot cleaner may change its cleaning mode into a reinforced one to increase an intake force.

Preferably, the floor in which the magnets are installed is made of wood for the convenience of installation. Also, preferably, the installation place of the magnets is a standardized living space such as an apartment for the purpose of the convenience of installation.

Such a magnet disposition structure of the present invention can vary according to objects and places, and the present invention is not limited to a robot cleaner but it will be understood by those skilled in the art that the present invention can be applied to other self-moving robots having different purposes.

By the position-recognizing system of a self-moving robot according to one embodiment of the present invention, magnets mounted in a floor are sensed through a magnetic sensor, so that a current position of the self-moving robot can be accurately recognized and thusly, the robot can be accurately controlled.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A position-recognizing system of a self-moving robot comprising:
   a floor in which a magnet is inserted; and
   a self-moving robot provided with a magnetic sensor that can sense the magnet while the robot is moving on the floor,
   wherein a disposition structure of the magnet comprises:
   an outer edge identification portion formed at an outer edge of the floor in order to indicate limits of an moving area of the robot;
   a center identification portion formed at a central portion in order to indicate the center of the floor; and
   an entrance identification portion formed toward an entrance of a certain space in order to induce the robot into the space, and
   wherein the center identification portion or the entrance identification portion includes a particular arrangement of one or more magnets that identifies an operation mode of the self-moving robot such that when the self-moving robot is induced into the certain space, the self-moving robot performs an operation in accordance with the operation mode identified by the particular arrangement of the one or more magnets.

2. The system of claim 1, wherein the floor is formed of a wood flooring material.

3. The system of claim 1, wherein the disposition structure of the magnet further comprises:
   a charging identification portion formed in front of a connection terminal so as to identify the connection terminal for recharging the robot.

4. The system of claim 1, wherein the self-moving robot is a robot for cleaning.

5. A position-recognizing system for a self-moving robot comprising:
   a floor formed of a wood flooring material, in which a magnet is inserted; and
   a self-moving robot including a body case, ultrasonic wave transmitter and receptor installed inside the body case, and a magnetic sensor installed on a bottom of the body case for sensing the magnet,
   wherein a disposition structure of the magnet comprises:
   an outer edge identification portion formed at an outer edge of the floor in order to indicate limits of a moving area of the robot;
   a center identification portion formed at a central portion in order to indicate the center of the floor; and
   an entrance identification portion formed toward an entrance of a certain space in order to induce the robot into the space, and
   wherein the center identification portion or the entrance identification portion includes a particular arrangement of one or more magnets that identifies an operation mode of the self-moving robot such that when the self-moving robot is induced into the certain space, the self-moving moving robot performs an operation in accordance with the operation mod identified by the particular arrangement of the one or more magnets.

6. The system of claim 5, wherein the disposition structure of the magnet further comprises:
   a charging identification portion formed in front of a connection terminal in order to identify the connection terminal for recharging the robot.

7. The system of claim 5, wherein the particular arrangement of the center identification portion includes a cross-shaped magnet, a pentagon-shaped magnet or a diamond-shaped magnet.

8. The system of claim 5, wherein the entrance identification portion includes one magnet, two separate magnets, three magnets separately disposed in a line shape, or four magnet units separately arranged in a T-shape indicating a room number assigned to the certain space in a one-to-one corresponding manner.

9. A position-recognizing system of a self moving robot comprising:
   a floor formed of a wood flooring material, in which a magnet is inserted in a line or cross form; and
   a self-moving robot including a body case, ultrasonic wave transmitter and receptor installed inside the body case, a plurality of magnetic sensors installed at an edge of a bottom of the body case at regular intervals therebetween for sensing the magnet, and a control unit processing a signal received from the magnetic sensors,
   wherein a disposition structure of the magnet comprises:
   an outer edge identification portion formed at an outer edge of the floor in a line form in order to display limits of a moving area of the robot;
   a center identification portion formed at a central portion in a cross form in order to indicate the center of the floor; and
   an entrance identification portion formed towards an entrance of a certain space in order to induce the robot into the certain space, and
   wherein the center identification portion or the entrance identification portion includes a particular arrangement of one or more magnets that identifies an operation mode of the self-moving robot such that when the self-moving robot is induced into the certain space, the self-moving robot performs an operation in accordance with the operation mode identified by the particular arrangement of the one or more magnets.

10. The system of claim 9, wherein the disposition structure of the magnet further comprises:
    a charging identification portion formed in front of a connection terminal in order to identify the connection terminal for recharging the robot.

11. The system of claim 9, wherein the particular arrangement of the center identification portion includes a cross-shaped magnet, a pentagon-shaped magnet or a diamond-shaped magnet.

12. The system of claim 9, wherein the entrance identification portion includes one magnet, two separate magnets, three magnets separately disposed in a line shape, or four magnet units separately arranged in a T-shape indicating a room number assigned to the certain space in a one-to-one corresponding manner.

13. The system of claim 1, wherein the particular arrangement of the center identification portion includes a cross-shaped magnet, a pentagon-shaped magnet or a diamond-shaped magnet.

14. The system of claim 11, wherein the cross-shaped magnet indicates the certain space is a general room, the pentagon-shaped magnet indicates the certain space is a living room and the diamond-shaped magnet indicates the certain space is a kitchen.

15. The system of claim 1, wherein the particular arrangement of the entrance identification portion includes one magnet two separate magnets, three magnets separately disposed in a line shape, or four magnet units separately arranged in a T-shape indicating a room number assigned to the certain space in a one-to-one corresponding manner.

16. The system of claim 7, wherein the cross-shaped magnet indicates the certain space is a general room, the pentagon-shaped magnet indicates the certain space is a living room and the diamond-shaped magnet indicates the certain space is a kitchen.

17. The system of claim 11, wherein the cross-shaped magnet indicates the certain space is a general room, the pentagon-shaped magnet indicates the certain space is a living room and the diamond-shaped magnet indicates the certain space is a kitchen.

* * * * *